United States Patent
Dutta et al.

(10) Patent No.: US 9,995,172 B2
(45) Date of Patent: Jun. 12, 2018

(54) TURBINE NOZZLE WITH COOLING CHANNEL COOLANT DISCHARGE PLENUM

(71) Applicant: General Electric Company, Schenectady, NY (US)

(72) Inventors: Sandip Dutta, Greenville, SC (US); Benjamin Paul Lacy, Greer, SC (US); Gary Michael Itzel, Simpsonville, SC (US); Stephen Paul Wassynger, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 226 days.

(21) Appl. No.: 14/880,575

(22) Filed: Oct. 12, 2015

(65) Prior Publication Data

US 2017/0101891 A1 Apr. 13, 2017

(51) Int. Cl.
*F01D 25/12* (2006.01)
*F01D 9/04* (2006.01)

(52) U.S. Cl.
CPC .............. *F01D 25/12* (2013.01); *F01D 9/041* (2013.01); *F05D 2220/32* (2013.01); *F05D 2240/128* (2013.01); *F05D 2240/81* (2013.01); *F05D 2260/202* (2013.01); *F05D 2260/204* (2013.01); *Y02T 50/676* (2013.01)

(58) Field of Classification Search
CPC .......... F01D 25/12; F01D 5/187; F01D 9/041; F05D 2240/128; F05D 2240/81; F05D 2260/202; F05D 2260/204; Y02T 50/676
See application file for complete search history.

(56) References Cited

U.S. PATENT DOCUMENTS

| 3,844,679 | A | 10/1974 | Grondahl et al. |
| 4,353,679 | A | 10/1982 | Hauser |
| 6,241,467 | B1 | 6/2001 | Zelesky et al. |
| 8,096,772 | B2 | 1/2012 | Liang |
| 8,511,995 | B1 | 8/2013 | Liang |
| 8,632,298 | B1 | 1/2014 | Liang |
| 8,714,909 | B2 | 5/2014 | Propheter-Hinckley |
| 8,753,071 | B2 | 6/2014 | Bunker |

(Continued)

FOREIGN PATENT DOCUMENTS

EP  2 372 086 A2  10/2011

OTHER PUBLICATIONS

Co-pending U.S. Appl. No. 14/880,565, filed Oct. 12, 2015.

(Continued)

*Primary Examiner* — Logan Kraft
*Assistant Examiner* — Peter T Hrubiec
(74) *Attorney, Agent, or Firm* — Dority & Manning, P.A.

(57) ABSTRACT

A turbine nozzle includes an airfoil that extends in span from an inner band to an outer band where the inner band and the outer band define inner and outer flow boundaries of the turbine nozzle. At least one of the inner band and the outer band defines a plurality of cooling channels formed and a coolant discharge plenum beneath a gas side surface of the corresponding inner or outer band that is in fluid communication with the cooling channels. The coolant discharge plenum is formed within the inner band or the outer band downstream from the cooling channels and upstream from a plurality of coolant discharge ports.

20 Claims, 7 Drawing Sheets

(56) References Cited

U.S. PATENT DOCUMENTS

| | | |
|---|---|---|
| 8,770,936 B1 | 7/2014 | Liang |
| 8,956,104 B2 | 2/2015 | Lacy et al. |
| 9,015,944 B2 | 4/2015 | Lacy et al. |
| 2005/0100437 A1* | 5/2005 | Phillips .................. F01D 5/147 |
| | | 415/115 |
| 2010/0226788 A1 | 9/2010 | Liang |
| 2012/0082549 A1 | 4/2012 | Ellis et al. |
| 2012/0328451 A1 | 12/2012 | Lomas et al. |
| 2014/0154063 A1* | 6/2014 | Zhang .................... F01D 5/186 |
| | | 415/177 |

OTHER PUBLICATIONS

Co-pending U.S. Appl. No. 14/880,580, filed Oct. 12, 2015.

Extended European Search Report and Opinion issued in connection with corresponding EP Application No. 16193076.3 dated Mar. 8, 2017.

* cited by examiner

US 9,995,172 B2

TURBINE NOZZLE WITH COOLING CHANNEL COOLANT DISCHARGE PLENUM

FIELD OF THE INVENTION

The present invention generally relates to a turbine nozzle for a gas turbine. More particularly, this invention relates to a turbine nozzle with cooling channels and a coolant discharge plenum defined within an inner or outer band of the turbine nozzle.

BACKGROUND OF THE INVENTION

A gas turbine, such as an industrial, aircraft or marine gas turbine generally includes, in serial flow order, a compressor, a combustor and a turbine. The turbine has multiple stages with each stage including a row of turbine nozzles and an adjacent row of turbine rotor blades disposed downstream from the turbine nozzles. The turbine nozzles are held stationary within the turbine and the turbine rotor blades rotate with a rotor shaft. The various turbine stages define a hot gas path through the turbine.

During operation, the compressor provides compressed air to the combustor. The compressed air is mixed with fuel and burned in a combustion chamber or reaction zone defined within the combustor to produce a high velocity stream of hot gas. The hot gas flows from the combustor into the hot gas path of the turbine via a turbine inlet. As the hot gas flows through each successive stage, kinetic energy from the high velocity hot gas is transferred to the rows of turbine rotor blades, thus causing the rotor shaft to rotate and produce mechanical work.

Turbine efficiency may be related, at least in part, to the temperature of the hot gas flowing through the turbine hot gas path. For example, the higher the temperature of the hot gas, the greater the overall efficiency of the turbine. The maximum temperature of the hot gas is limited, at least in part, by material properties of the various turbine components such as the turbine nozzles and turbine rotor blades and by the effectiveness of various cooling circuits and a cooling medium that circulates through the cooling circuits to provide cooling to the various turbine components. Turbine nozzles generally include an airfoil that extends in span between an inner band or shroud and an outer band or shroud. The inner band and the outer band define inner and outer flow boundaries of the hot gas path and are exposed to the hot gases. The inner and/or outer bands may be cooled by passing a cooling medium such as compressed air through a central or core cooling channel that extends radially through the airfoil portion of the turbine nozzle. A portion of the cooling medium flows through various film holes defined along the airfoil, thus providing film cooling to the airfoil.

BRIEF DESCRIPTION OF THE INVENTION

Aspects and advantages of the invention are set forth below in the following description, or may be obvious from the description, or may be learned through practice of the invention.

One embodiment of the present invention is a turbine nozzle. The turbine nozzle includes an airfoil that extends in span from an inner band to an outer band where the inner band and the outer band define inner and outer flow boundaries of the turbine nozzle. The inner band defines a plurality of cooling channels and a coolant discharge plenum formed beneath a gas side surface of the inner band where the coolant discharge plenum is in fluid communication with the cooling channels. The coolant discharge plenum is formed within the inner band downstream from the cooling channels and upstream from a plurality of coolant discharge ports.

Another embodiment of the present invention is a turbine nozzle. The turbine nozzle includes an airfoil that extends in span from an inner band to an outer band where the inner band and the outer band define inner and outer flow boundaries of the turbine nozzle. The outer band defines a plurality of cooling channels and a coolant discharge plenum formed beneath a gas side surface of the outer band where the coolant discharge plenum is in fluid communication with the cooling channels. The coolant discharge plenum is formed within the outer band downstream from the cooling channels and upstream from a plurality of coolant discharge ports.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
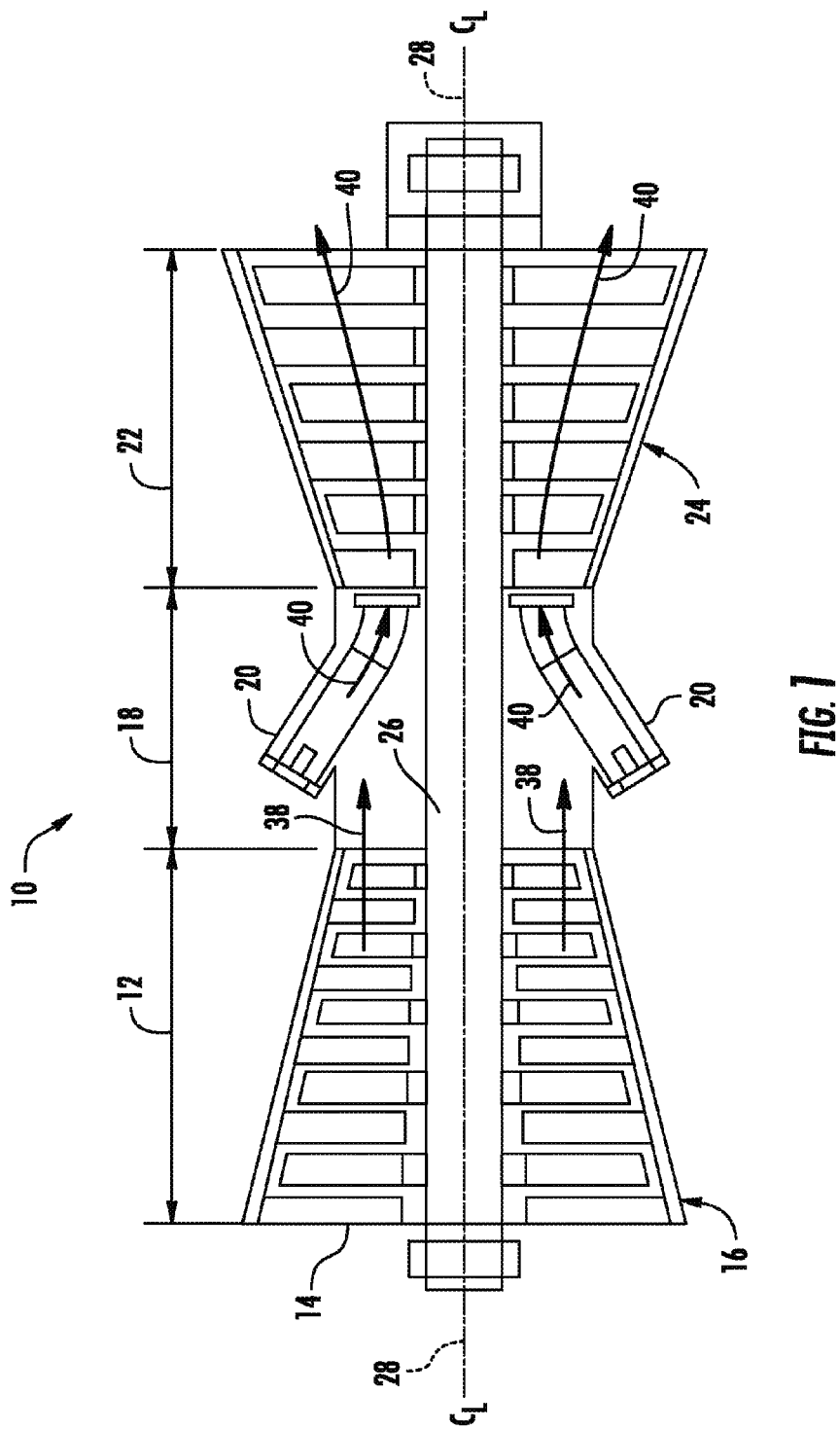
FIG. 1 is a schematic view of an exemplary gas turbine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a turbine nozzle for a land based power generating gas turbine for purposes of illustration, one of ordinary skill in the art will readily appreciate that embodiments of the present invention may be applied to any style or type of gas turbine and are not limited to land based power generating gas turbines unless specifically recited in the claims.

Referring now to the drawings, FIG. 1 illustrates a schematic of an exemplary gas turbine 10 as may incorporate various embodiments of the present invention. As shown, the gas turbine 10 generally includes a compressor section 12 having an inlet 14 disposed at an upstream end of an axial compressor 16. The gas turbine 10 further includes a combustion section 18 having one or more combustors 20 positioned downstream from the compressor 16 and a turbine section 22 including a turbine 24 such as an expansion turbine that is disposed downstream from the combustion section 18. A shaft 26 extends axially through the compressor 16 and the turbine 24 along an axial centerline 28 of the gas turbine 10.

Figure 2:
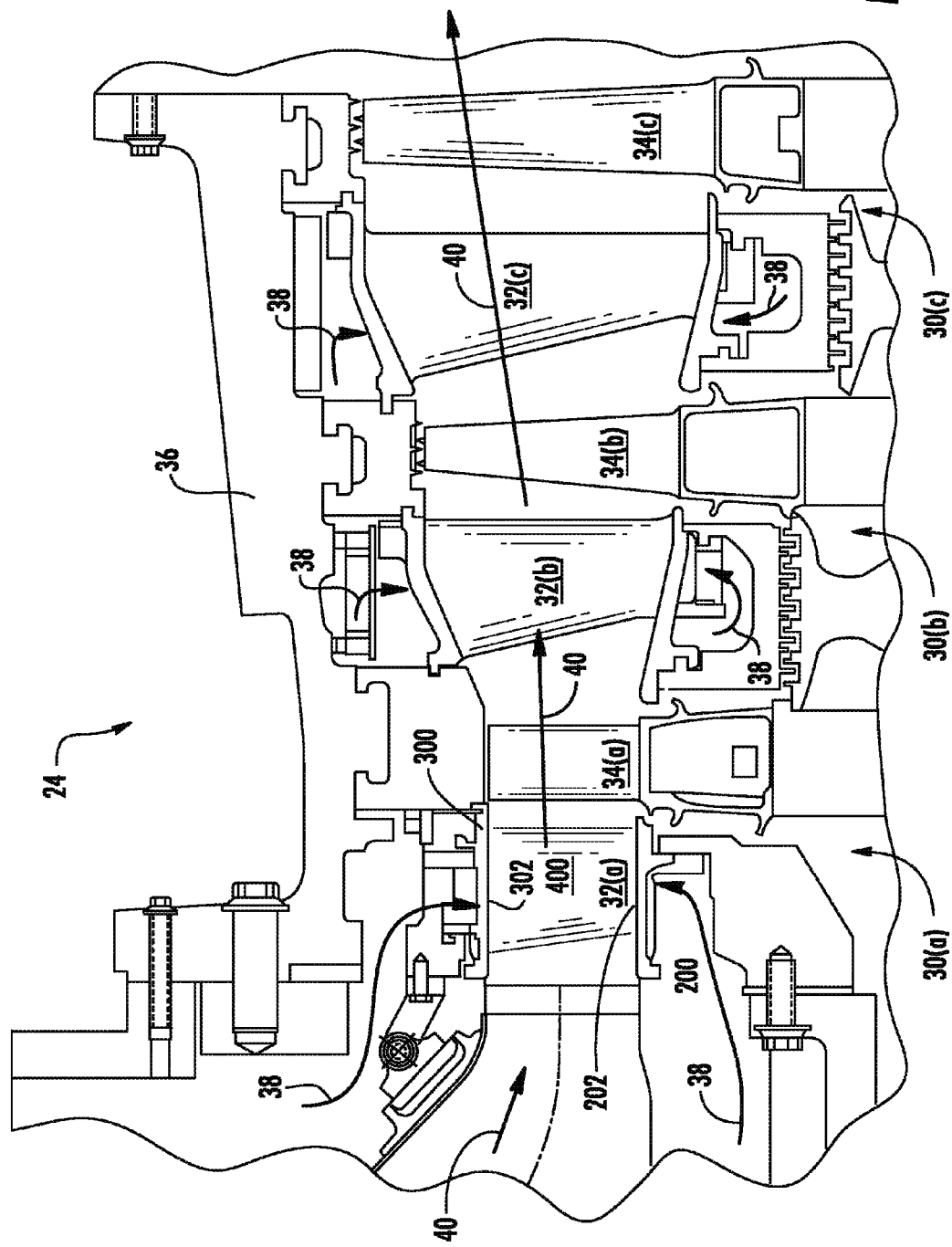
FIG. 2 is a cross sectioned side view of an exemplary turbine section of a gas turbine as may incorporated in various embodiments of the present invention.

FIG. 2 provides a cross sectioned side view of an exemplary turbine 24 as may incorporate various embodiments of the present invention. As shown in FIG. 2, the turbine 24 may include multiple turbine stages 30. For example, the turbine 24 may include three turbine stages 30 including a first stage 30(a), second stage 30(b) and third stage 30(c). The total number of turbine stages 30 may be more or less than three and embodiments of the present invention should not be limited to three turbine stages unless otherwise recited in the claims.

As shown in FIG. 2, each stage 30(a-c) includes, in serial flow order, a corresponding row of turbine nozzles 32(a), 32(b) and 32(c) and a corresponding row of turbine rotor blades 34(a), 34(b) and 34(c) axially spaced along the shaft 26 (FIG. 1). A casing or shell 36 circumferentially surrounds each stage 30(a-c) of the turbine nozzles 32(a-c) and the turbine rotor blades 34(a-c). The turbine nozzles 32(a-c) remain stationary relative to the turbine rotor blades 34(a-c) during operation of the gas turbine 10. For example, the turbine nozzles 32 may be connected to the casing 36 or to a nozzle ring (not shown).

In operation, as shown in FIGS. 1 and 2 collectively, compressed air 38 from the compressor 16 is provided to the combustors 20 where it is mixed with fuel and burned to provide a stream of hot combustion gases 40 that flows from the combustors 20 into the turbine 24. At least a portion of the compressed air 38 may be used as a cooling medium for cooling the various components of the turbine such as the turbine nozzles 32(a-c) and the turbine rotor blades 34(a-c).

Figure 3:
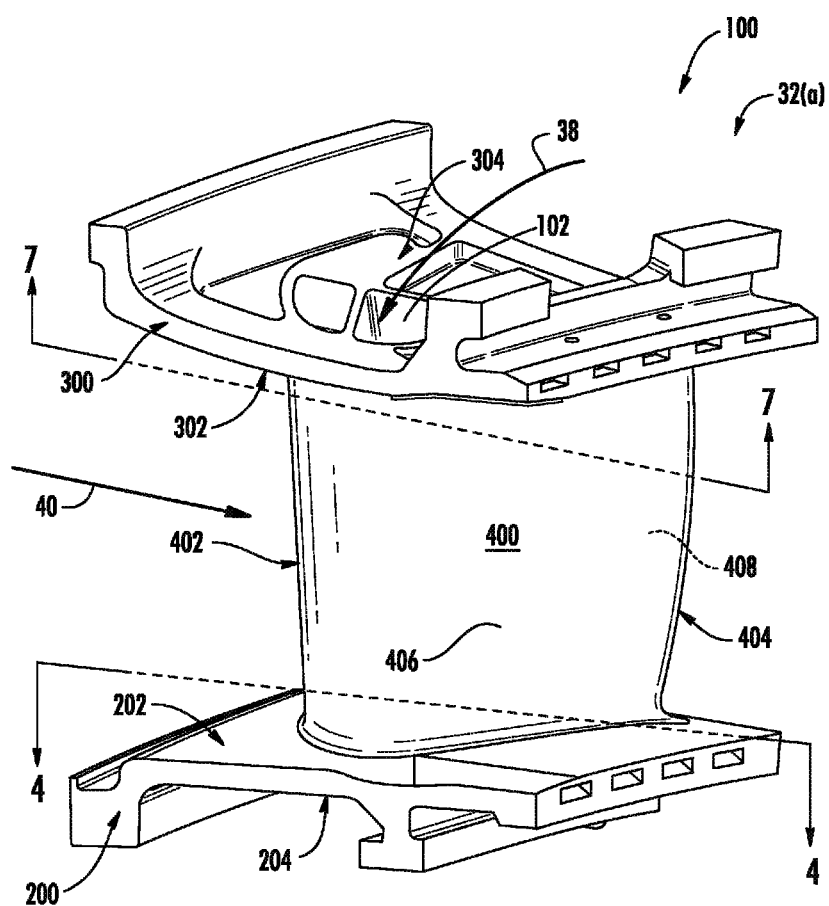
FIG. 3 is a perspective side view of an exemplary turbine nozzle as may incorporate one or more embodiments of the present invention.

FIG. 3 provides a perspective view of an exemplary turbine nozzle 100 as may be incorporated into the turbine 24 as shown in FIG. 2 and as may incorporate various embodiments of the present invention. Turbine nozzle 100 may correspond with or be installed in place of any of turbine nozzles 32(a-c). In particular embodiments, turbine nozzle 100 corresponds with turbine nozzle 32(a) of the first stage 30(a) which may also be known in the industry as a stage one nozzle or S1N.

As shown in FIG. 3, the turbine nozzle 100 includes an inner band 200, an outer band 300 that is radially spaced from the inner band 200 and an airfoil 400 that extends in span from the inner band 200 to the outer band 300. The inner band 200 includes a gas side 202 and a back side 204 that is oriented radially inwardly from the gas side 202. The outer band 300 includes a gas side 302 and a back side 304 that is oriented radially outwardly from the gas side 302. As shown in FIGS. 2 and 3 collectively, the gas side 302 of the outer band 300 and the gas side 202 of the inner band 200 define inner and outer radial flow boundaries for the stream of hot combustion gases 40 flowing at high velocity from the combustors 20 through the turbine 24. As shown in FIG. 3, the airfoil 400 includes a leading edge portion 402, a trailing edge portion 404, a suction side wall 406 and a pressure side wall 408.

Figure 4:
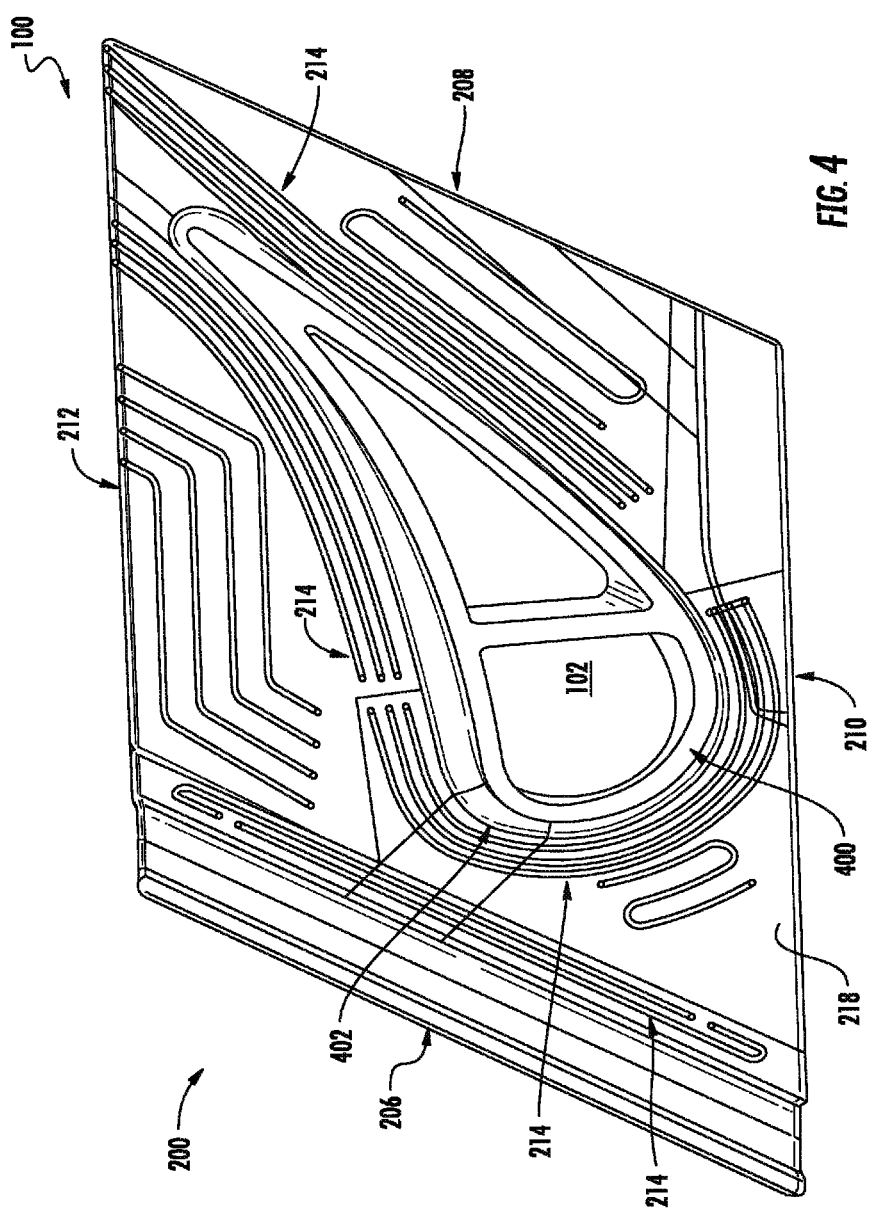
FIG. 4 is a cross sectioned top view of a portion of the turbine nozzle including an inner band as shown in FIG. 3 taken along section line 4-4, according to at least one embodiment of the present invention.

FIG. 4 provides a cross sectioned top view of a portion of the turbine nozzle 100 as taken along section line 4-4 as shown in FIG. 3 and includes a portion of the airfoil 400 and the inner band 200 according to one embodiment of the present invention. As shown in FIG. 4, the inner band 200 includes a forward wall 206 forward or upstream from the leading edge portion 402 of the airfoil 400, an aft wall 208 aft or downstream from the trailing edge portion 404, a suction side wall 210 and a pressure side wall 212. In particular arrangements, the turbine nozzle 100 includes and/or at least partially defines a primary cooling channel 102. In one embodiment, the primary cooling channel 102 extends radially or substantially radially through the outer band 300, the airfoil 400 and the inner band 200.

Figure 5:
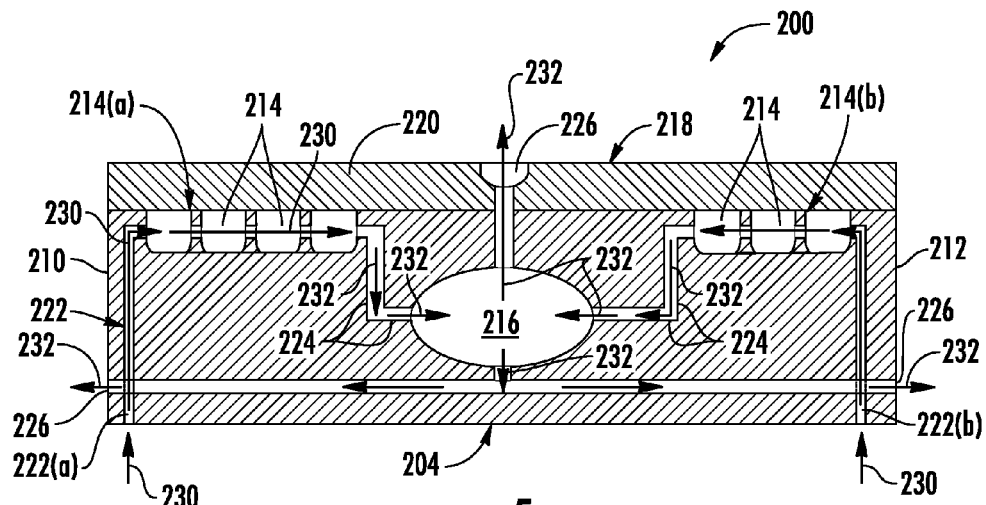
FIG. 5 is an enlarged simplified cross sectional side view of a portion of the inner band as shown in FIG. 4, according to one or more embodiments of the present invention.

FIG. 5 provides a simplified cross sectional view of a portion of the inner band 200 as shown in FIG. 4, according to at least one embodiment of the present invention. In one embodiment, as shown in FIGS. 4 and 5 collectively, the inner band 200 defines a plurality of cooling channels 214 (shown in dashed lines in FIG. 4) and a coolant discharge plenum 216 (FIG. 5) formed beneath a gas side surface 218 of the inner band 200 downstream from the cooling channels 214. The plurality of cooling channels 214 may be machined, cast or otherwise formed beneath the gas side surface 218 of the inner band 200. In particular embodiments, as shown in FIG. 5, the gas side surface 218 may be at least partially formed by one or more plates and/or a coating 220 which covers and/or seals the plurality of cooling channels 214. As shown in FIGS. 4 and 5, the plurality of cooling channels 214 may comprise multiple sets of cooling channels 214. For example, in one embodiment, as shown in FIG. 5, the plurality of cooling channels 214 comprises, at least a first set of cooling channels 214(a) and a second set of cooling channels 214(b).

The plurality of cooling channels 214 may be disposed beneath the gas side surface 218 in various locations depending on particular cooling requirements of the inner band 200. For example, as shown in FIG. 4, at least some of the plurality of cooling channels 214 may be arranged or oriented so as to follow or substantially follow the curvature or profile of one or more of the leading edge portion 402, the suction side wall 406, the trialing edge portion 404 and the pressure side wall 408 of the airfoil 400. At least some of the cooling channels 214 may be disposed proximate to the suction side wall 210 or the aft wall 208 of the inner band 200 and/or proximate to the forward wall 206 of the inner band 200 between the suction side wall 210 and the pressure side wall 212.

In particular embodiments, as shown in FIG. 5, the inner band 200 defines at least one inlet passage 222 which provides for fluid communication between a coolant supply such as the compressor 16 (FIG. 2) and the cooling channels 214. In particular embodiments, the inlet passage(s) 222 may extend through the back side 204 of the inner band 200. During operation of the gas turbine 10, a coolant such as a portion of the compressed air 38 from the compressor 16 may be routed through the inlet passage(s) 222 and into the plurality of cooling channels 214. In one embodiment, the first set of cooling channels 214(a) is in fluid communication with a first inlet passage 222(a) and the second set of cooling channels 214(b) is in fluid communication with a second inlet passage 222(b).

In various embodiments, as shown in FIG. 5, at least one internal passage 224 defined within and/or by the inner band 200 provides for fluid communication between the cooling channels 214 or sets of cooling channels 214(a-b) and the coolant discharge plenum 216. The internal passage(s) 224 may form a network of internal passages 224 defined within the inner band 200 which provide for coolant flow from the plurality of cooling channels 214 into the coolant discharge plenum 216.

Figure 6:
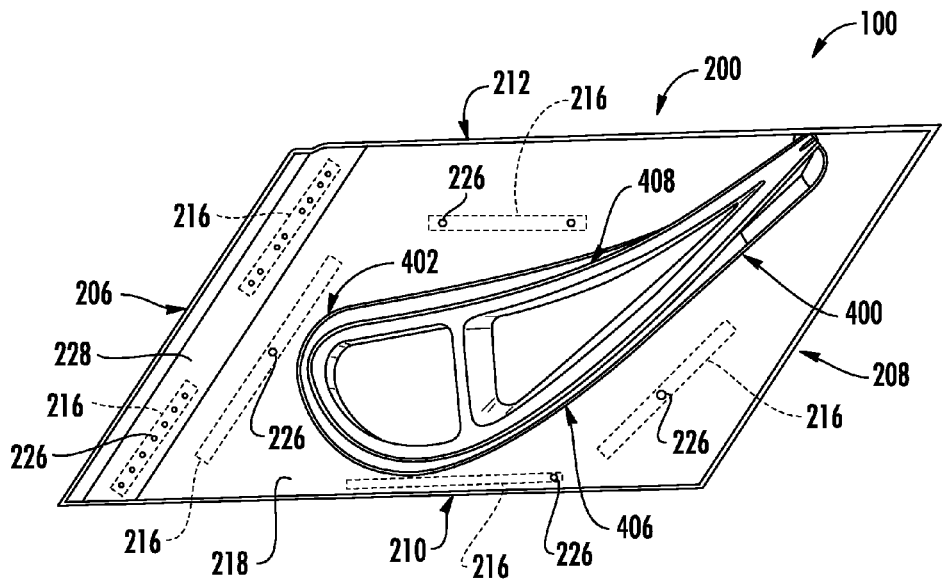
FIG. 6 is a top view or the turbine nozzle as shown in FIG. 4, according to at least one embodiment of the present invention.

FIG. 6 provides a top or radially inward view of a portion of the turbine nozzle 100 including the inner band 200 and a portion of the airfoil 400 as shown in the FIG. 4, with the cooling channels 214 hidden below the gas side surface 218 according to one or more embodiments of the present invention. As shown in FIG. 6, the coolant discharge plenum 216 (shown in dashed lines) may be positioned at various locations along the inner band 200 beneath the gas side surface 218. For example, the coolant discharge plenum 216 may extend between the forward wall 206 and the aft wall 208 of the inner band 200, may be disposed between the suction side wall 406 of the airfoil 400 and the suction side wall 210 of the inner band 200, may be disposed between the pressure side wall 408 of the airfoil 400 and the pressure side wall 212 of the inner band 200 or may extend between the suction side wall 210 and the pressure side wall 212 of the inner band 200 forward of the leading edge portion 402 of the airfoil 400. In particular embodiments, the inner band 200 may define a plurality of coolant discharge plenums 216 disposed at various locations along the inner band 200.

In various embodiments, as shown in FIG. 5, the coolant discharge plenum 216 is disposed and/or defined within the inner band 200 upstream from one or more coolant discharge ports 226. In particular embodiments, as shown in FIGS. 5 and 6, the coolant discharge port(s) 226 may extend through the gas side surface 218 to provide film cooling thereto. Discharge port(s) 226 may be disposed at any location along the gas side surface 218 depending, at least in part, on cooling requirements and/or positioning of coolant discharge plenum 216. For example, in one embodiment as shown in FIG. 6, at least one coolant discharge port 226 may be formed or disposed along the gas side surface 218 of the inner band 200 upstream from the leading edge portion 402 of the airfoil 400. In one embodiment, at least one coolant discharge port 226 may be formed or disposed along the gas side surface 218 of the inner band 200 along a leading edge portion 228 of the inner band 200. In particular embodiments, as shown in FIG. 5, at least one coolant discharge port 226 may extend through the suction side wall 210 of the inner band 200. In particular embodiments, as shown in FIG. 5, at least one coolant discharge port 226 may extend through the pressure side wall 212 of the inner band 200.

In operation, a coolant 230 such as compressed air 38 flows into the inlet passages 222 and flows through the cooling channels 214, thus providing convection cooling to the gas side surface 218 of the inner band. Spent coolant 232 is then routed through the internal passages 224 to the coolant discharge plenum 216 which is at a lower pressure than the cooling channels 214. The spent coolant 232 is then routed through the coolant discharge port(s) 226, for example, to provide film cooling to the gas side surface 218 of the inner band 200 and to cool and/or to help form a hot gas seal between adjacent inner bands 200 of adjacent turbine nozzles 100.

Figure 7:
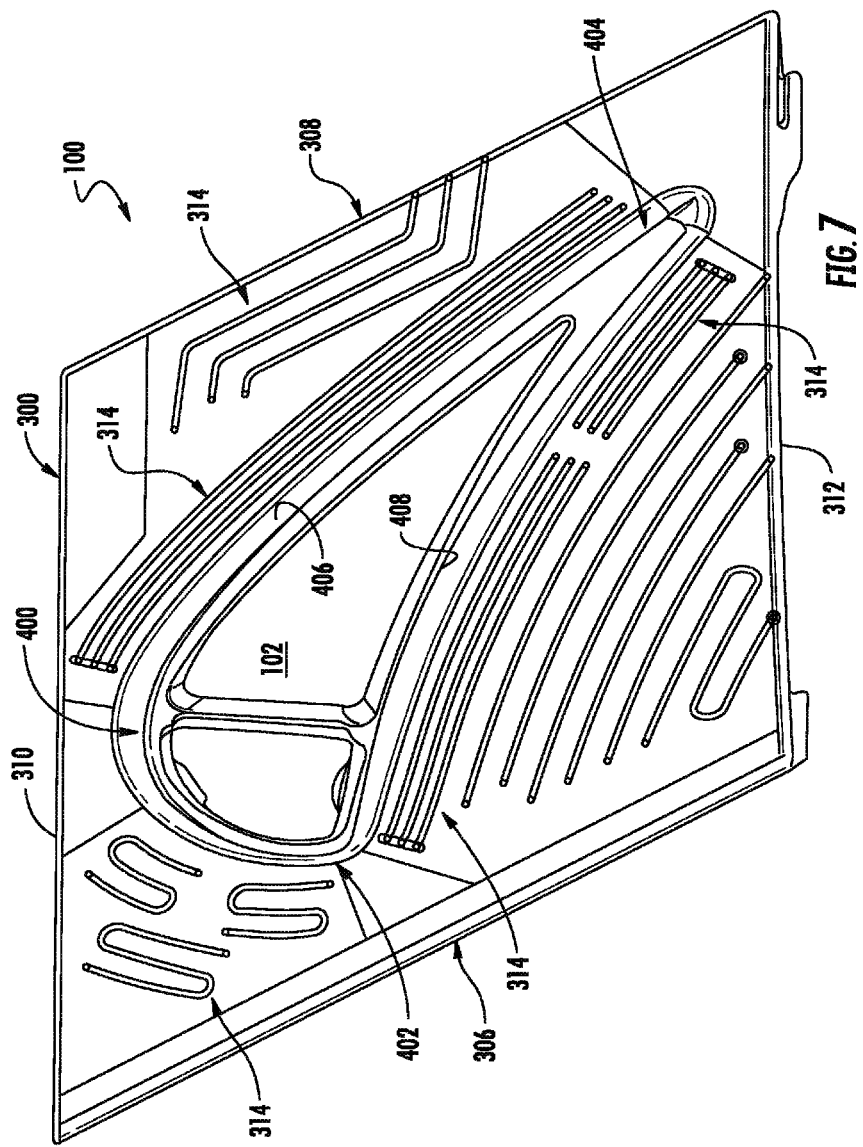
FIG. 7 is a cross sectioned top view of a portion of the turbine nozzle including an inner band as shown in FIG. 3 taken along section line 7-7, according to at least one embodiment of the present invention.

FIG. 7 provides a cross sectioned top view of a portion of the turbine nozzle 100 as taken along section line 7-7 as shown in FIG. 3 and includes a portion of the airfoil 400 and the outer band 300 according to one embodiment of the present invention. As shown in FIG. 7, the outer band 300 includes a forward wall 306 forward or upstream from the leading edge portion 402 of the airfoil 400, an aft wall 308 aft or downstream from the trailing edge portion 404, a suction side wall 310 and a pressure side wall 312. In one embodiment, the primary cooling channel 102 extends radially or substantially radially through the inner band 200, the airfoil 400 and the outer band 300.

Figure 8:
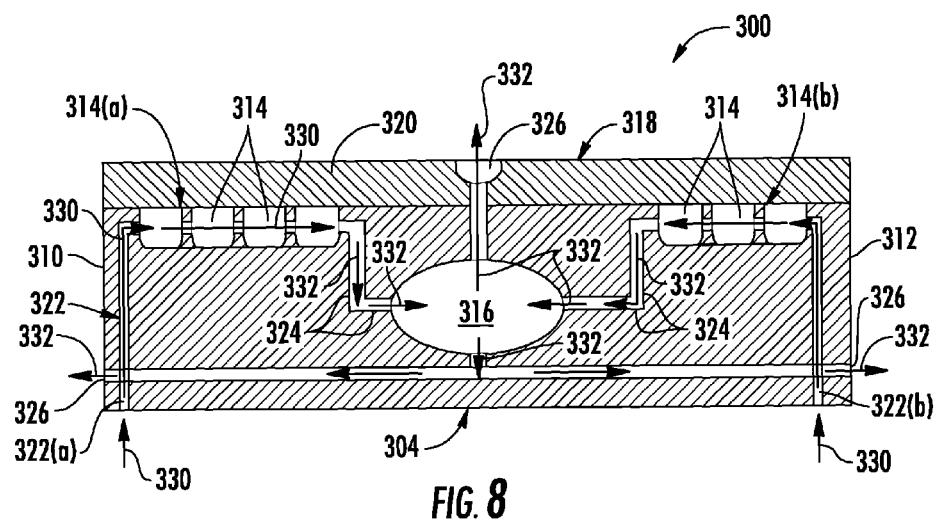
FIG. 8 is an enlarged simplified cross sectional side view of a portion of the inner band as shown in FIG. 7, according to one or more embodiments of the present invention.

FIG. 8 provides a simplified cross sectional view of a portion of the outer band 300 as shown in FIG. 7, according to at least one embodiment of the present invention. In one embodiment, as shown in FIGS. 7 and 8 collectively, the outer band 300 defines a plurality of cooling channels 314 (shown in dashed lines in FIG. 7) and a coolant discharge plenum 316 (FIG. 8) formed beneath a gas side surface 318 of the outer band 300 downstream from the cooling channels 314. The plurality of cooling channels 314 may be machined, cast or otherwise formed beneath the gas side surface 318 of the outer band 300. In particular embodiments, as shown in FIG. 8, the gas side surface 318 may be at least partially formed by one or more plates and/or a coating 320 which covers and/or seals the plurality of cooling channels 314. As shown in FIGS. 7 and 8, the plurality of cooling channels 314 may comprise multiple sets of cooling channels 314. For example, in one embodiment, as shown in FIG. 8, the plurality of cooling channels 314 comprises, at least a first set of cooling channels 314(a) and a second set of cooling channels 314(b).

The plurality of cooling channels 314 may be disposed beneath the gas side surface 318 in various locations depending on particular cooling requirements of the outer band 300. For example, as shown in FIG. 7, at least some of the plurality of cooling channels 314 may be arranged or oriented so as to follow or substantially follow the curvature or profile of one or more of the leading edge portion 402, the suction side wall 406, the trialing edge portion 404 and the pressure side wall 408 of the airfoil 400. At least some of the cooling channels 314 may be disposed proximate to the suction side wall 310 or the aft wall 308 of the outer band 300 and/or proximate to the forward wall 306 of the outer band 300 between the suction side wall 310 and the pressure side wall 312.

In particular embodiments, as shown in FIG. 8, the outer band 300 defines at least one inlet passage 322 which provides for fluid communication between a coolant supply such as the compressor 16 (FIG. 2) and the cooling channels 314. In particular embodiments, the inlet passage(s) 322 may extend through the back side 304 of the outer band 300. During operation of the gas turbine 10, a coolant such as a portion of the compressed air 38 from the compressor 16 may be routed through the inlet passage(s) 322 and into the plurality of cooling channels 314. In one embodiment, the first set of cooling channels 314(a) is in fluid communication with a first inlet passage 322(a) and the second set of cooling channels 314(b) is in fluid communication with a second inlet passage 322(b).

In various embodiments, as shown in FIG. 8, at least one internal passage 324 defined within and/or by the outer band 300 provides for fluid communication between the cooling channels 314 or sets of cooling channels 314(a-b) and the coolant discharge plenum 316. The internal passage(s) 324 may form a network of internal passages 324 defined within the outer band 300 which provide for coolant flow from the plurality of cooling channels 314 into the coolant discharge plenum 316.

Figure 9:
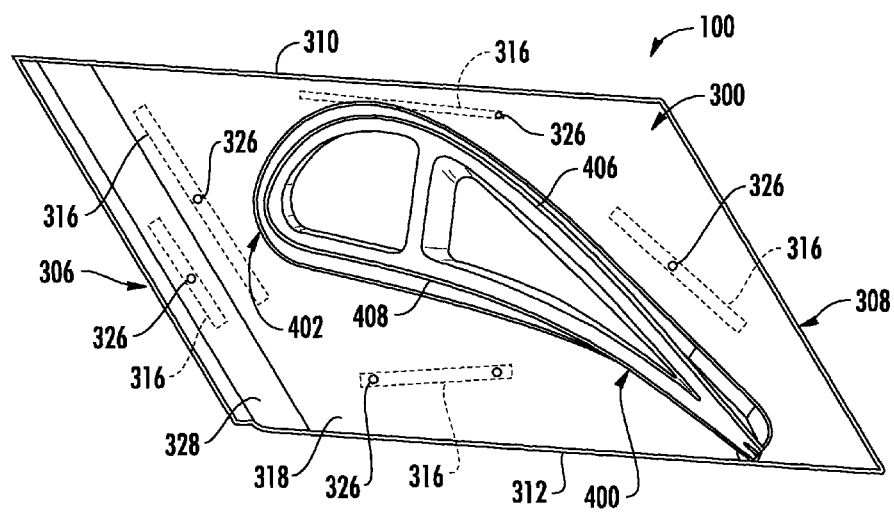
FIG. 9 is a top view or the turbine nozzle as shown in FIG. 7, according to at least one embodiment of the present invention.

FIG. 9 provides a top or radially inward view of a portion of the turbine nozzle 100 including the outer band 300 and a portion of the airfoil 400 as shown in FIG. 7, with the cooling channels 314 hidden below the gas side surface 318 according to one or more embodiments of the present invention. In various embodiments, as shown in FIG. 9, the coolant discharge plenum 316 (shown in dashed lines) may be positioned at various locations along the outer band 300 beneath the gas side surface 318. For example, the coolant discharge plenum 316 may extend between the forward wall 306 and the aft wall 308 of the outer band 300, may be disposed between the suction side wall 406 of the airfoil 400 and the suction side wall 310 of the outer band 300, may be disposed between the pressure side wall 408 of the airfoil 400 and the pressure side wall 312 of the outer band 300 or may extend between the suction side wall 310 and the pressure side wall 312 of the outer band 300 forward of the leading edge portion 402 of the airfoil 400. In particular embodiments, the outer band 300 may define a plurality of coolant discharge plenums 316 disposed at various locations along the outer band 300.

In various embodiments, as shown in FIG. 8, the coolant discharge plenum 316 is disposed and/or defined within the outer band 300 upstream from one or more coolant discharge ports 326. In particular embodiments, as shown in FIGS. 8 and 9, the coolant discharge port(s) 326 may extend through the gas side surface 318 to provide film cooling thereto. Discharge port(s) 326 may be disposed at any location along the gas side surface 318 depending, at least in part, on cooling requirements and/or positioning of coolant discharge plenum 316. For example, in one embodiment as shown in FIG. 9, at least one coolant discharge port 326 may be formed or disposed along the gas side surface 318 of the outer band 300 upstream from the leading edge portion 402 of the airfoil 400. In one embodiment, at least one coolant discharge port 326 may be formed or disposed along the gas side surface 318 of the outer band 300 along a leading edge portion 328 of the outer band 300. In particular embodiments, as shown in FIG. 8, at least one coolant discharge port 326 may extend through the suction side wall 310 of the outer band 300. In particular embodiments, as shown in FIG. 8, at least one coolant discharge port 326 may extend through the pressure side wall 312 of the outer band 300. In particular embodiments, both the inner band 200 and the outer band 300 comprise inlet passages 222, 322, cooling channels 214, 314, internal passages 224, 324, coolant discharge plenums 216, 316 and cooling discharge ports 226, 326 respectfully.

In operation, a coolant 330 such as compressed air 38 flows into the inlet passages 322, flows through the cooling channels 314, thus providing convection cooling to the gas side surface 318 of the outer band 300. Spent coolant 332 is then routed through the internal passages 324 to the coolant discharge plenum 316 which is at a lower pressure than the cooling channels 314. The spent coolant 332 is then routed through the coolant discharge port(s) 326, for example, to provide film cooling to the gas side surface 318 of the outer band 300 and to cool and/or to help form a hot gas seal between adjacent outer bands 300 of adjacent turbine nozzles 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A turbine nozzle, comprising:
an airfoil that extends in span from an inner band to an outer band, the airfoil comprising a leading edge portion, a trailing edge portion, a suction side wall, and a pressure side wall, wherein the inner band and the outer band define inner and outer flow boundaries of the turbine nozzle;
wherein the inner band defines at least one inlet passage, a plurality of cooling channels arranged to follow a curvature of one or more of the leading edge portion, the trailing edge portion, the suction side wall, and the pressure side wall of the airfoil, at least one internal passage, and a coolant discharge plenum in fluid communication with the cooling channels, wherein the plurality of cooling channels and the coolant discharge plenum are formed beneath a gas side surface of the inner band, the plurality of cooling channels oriented parallel to the gas side surface of the inner band, wherein the at least one inlet passage extends radially outward from a back side of the inner band to the plurality of cooling channels, the at least one internal passage extends from the cooling channels to the coolant discharge plenum, and wherein the coolant discharge plenum is formed downstream from the cooling channels and upstream from at least one coolant discharge port.

2. The turbine nozzle as in claim 1, wherein the plurality of cooling channels comprises a first set of cooling channels and a second set of cooling channels, wherein the first set of cooling channels and the second set of cooling channels are downstream from a coolant supply and upstream from the coolant discharge plenum.

3. The turbine nozzle as in claim 1, wherein the coolant discharge plenum extends between a forward wall and an aft wall of the inner band and is disposed between a suction side wall of the airfoil and a suction side wall of the inner band.

4. The turbine nozzle as in claim 1, wherein the coolant discharge plenum extends between a forward wall and an aft wall of the inner band and is disposed between a pressure side wall of the airfoil and a pressure side wall of the inner band.

5. The turbine nozzle as in claim 1, wherein the coolant discharge plenum extends between a suction side wall and a pressure side wall of the inner band forward of a leading edge portion of the airfoil.

6. The turbine nozzle as in claim 1, wherein at least one coolant discharge port of the at least one coolant discharge port is formed along the gas side surface of the inner band.

7. The turbine nozzle as in claim 1, wherein at least one coolant discharge port of the at least one coolant discharge port is formed along the gas side surface of the inner band upstream from a leading edge portion of the airfoil.

8. The turbine nozzle as in claim 1, wherein at least one coolant discharge port of the at least one coolant discharge port is formed along the gas side surface of the inner band along a leading edge portion of the inner band.

9. The turbine nozzle as in claim 1, wherein at least one coolant discharge port of the at least one coolant discharge port is formed along a pressure side of the inner band.

10. The turbine nozzle as in claim 1, wherein at least one coolant discharge port of the at least one coolant discharge port is formed along a suction side of the inner band.

11. A turbine nozzle, comprising:
an airfoil that extends in span from an inner band to an outer band, the airfoil comprising a leading edge portion, a trailing edge portion, a suction side wall, and a pressure side wall, wherein the inner band and the outer band define inner and outer flow boundaries of the turbine nozzle;
wherein the outer band defines at least one inlet passage, a plurality of cooling channels arranged to follow a curvature of one or more of the leading edge portion, the trailing edge portion, the suction side wall, and the pressure side wall of the airfoil, at least one internal passage, and a coolant discharge plenum in fluid communication with the cooling channels, wherein the plurality of cooling channels and the coolant discharge plenum are formed beneath a gas side surface of the outer band, the plurality of cooling channels oriented parallel to the gas side surface of the outer band, wherein the at least one inlet passage extends radially inward from a back side of the outer band to the plurality of cooling channels, the at least one internal passage extends from the cooling channels to the coolant discharge plenum, and wherein the coolant discharge plenum is formed downstream from the cooling channels and upstream from at least one coolant discharge port.

12. The turbine nozzle as in claim 11, wherein the plurality of cooling channels comprises a first set of cooling channels and a second set of cooling channels, wherein the first set of cooling channels and the second set of cooling channels are downstream from a coolant supply and upstream from the coolant discharge plenum.

13. The turbine nozzle as in claim 11, wherein the coolant discharge plenum extends between a forward wall and an aft wall of the outer band and is disposed between a suction side wall of the airfoil and a suction side wall of the outer band.

14. The turbine nozzle as in claim 11, wherein the coolant discharge plenum extends between a forward wall and an aft wall of the outer band and is disposed between a pressure side wall of the airfoil and a pressure side wall of the outer band.

15. The turbine nozzle as in claim 11, wherein the coolant discharge plenum extends between a suction side wall and a pressure side wall of the outer band forward of a leading edge portion of the airfoil.

16. The turbine nozzle as in claim 11, wherein at least one coolant discharge port of the at least one coolant discharge port is formed along the gas side surface of the outer band.

17. The turbine nozzle as in claim 11, wherein at least one coolant discharge port of the at least one coolant discharge port is formed along the gas side surface of the outer band upstream from a leading edge portion of the airfoil.

18. The turbine nozzle as in claim 11, wherein at least one coolant discharge port of the at least one coolant discharge port is formed along the gas side surface of the outer band along a leading edge portion of the outer band.

19. The turbine nozzle as in claim 11, wherein at least one coolant discharge port of the at least one coolant discharge port is formed along a pressure side of the outer band.

20. The turbine nozzle as in claim 11, wherein at least one coolant discharge port of the at least one coolant discharge port is formed along a suction side of the outer band.

* * * * *